US 6,733,416 B2

(12) United States Patent
Mori et al.

(10) Patent No.: US 6,733,416 B2
(45) Date of Patent: May 11, 2004

(54) TOROIDAL TYPE CONTINUOUSLY VARIABLE TRANSIMISSION

(75) Inventors: Haruhito Mori, Yokohama (JP); Haruyoshi Kumura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/079,587

(22) Filed: Feb. 22, 2002

(65) Prior Publication Data

US 2002/0137593 A1 Sep. 26, 2002

(30) Foreign Application Priority Data

Mar. 26, 2001 (JP) ......................................... 2001-087284

(51) Int. Cl.[7] ............................................... F16H 15/38
(52) U.S. Cl. .............................. 476/46; 476/40; 476/42
(58) Field of Search ............................... 476/40, 42, 46

(56) References Cited

U.S. PATENT DOCUMENTS 5,830,103 A * 11/1998 Itoh et al. ...................... 476/8
2002/0137593 A1 * 9/2002 Mori et al. .................... 476/46
2003/0104898 A1 * 6/2003 Mori ............................ 476/46

FOREIGN PATENT DOCUMENTS

| EP | 0 930 448 A1 | 7/1999 |
| EP | 1 048 878 A1 | 11/2000 |
| JP | 7-198014 | 8/1995 |
| JP | 11-159590 | 6/1999 |

* cited by examiner

Primary Examiner—David Fenstermacher
(74) Attorney, Agent, or Firm—Foley & Lardner LLP

(57) ABSTRACT

In a toroidal type continuously variable transmission, a pair of power rollers are operatively interposed between input and output discs. Each power roller includes a power inner roller frictionally engaged with the input and output discs, a power outer roller receiving an axial load applied to the power inner roller from the input and output discs, a ball bearing operatively interposed between the power inner and outer rollers and a shaft receiving a radial load applied to the power inner roller from the input and output discs. The shaft is a one-body member comprising a first shaft portion on which the power outer roller is coaxially and tightly disposed and a second shaft portion on which the power inner roller is coaxially and rotatably disposed. The power outer roller and the shaft are produced separately. Upon assembly, these two parts are coupled together to constitute an integrated unit.

15 Claims, 14 Drawing Sheets

$t1 \leq t2$

TOROIDAL TYPE CONTINUOUSLY VARIABLE TRANSIMISSION

BACKGROUND OF INVENTION

1. Field of Invention

The present invention relates in general to transmissions of motor vehicles, and more particularly to toroidal type continuously variable transmissions of wheeled motor vehicles.

2. Description of Related Art

Hitherto, various toroidal type continuously variable transmissions have been proposed and put into practical use in the field of motor vehicles, for the easiness with which the motor vehicle having such transmission mounted thereon can be driven and handled.

Usually, to constantly keep operative contact between each of input and output discs and each of paired power rollers, the transmissions of such type are equipped with a loading cam device by which the distance between the input and output discs is adjusted in accordance with inclination of the power rollers. That is, the loading cam device functions to move the input disc axially relative to the output disc. However, since the pivot axis of the trunnion is an axis that is fixed, the operative contact of the power rollers to the input and output discs achieved by adjustment of the distance between the input and output discs by the loading cam device needs a movement of each power roller in a given direction perpendicular to both the rotation axis of the power roller and the trunnion pivot axis. Particularly, the movement of each power roller in such a given direction is needed when due to long usage, operation surfaces of such input and output discs have become deformed and/or when the input and output discs and the power rollers are subjected to a misalignment upon assembly.

Thus, in the transmissions of the above-mentioned type, a so-called "power roller supporting structure" is employed by which the movement of each power roller in such direction is carried out.

One of the power roller supporting structures is shown in Laid-open Japanese Patent Application (Tokkaihei) 11-159590. In the structure of this publication, there is employed a pivot shaft which supports the power roller and the trunnion on mutually eccentric portions, so that pivot movement of the power roller permits movement of the same in such a given direction.

Another power roller supporting structure is shown in Laid-Open Japanese Patent Application (Tokkaihei) 7-198014. The supporting structure of this publication is constructed to eliminate or minimize undesired torque shift of transmission.

The power roller supporting structure of 7-198014 publication is schematically illustrated in FIG. 12 of the accompanying drawings. As shown, a power roller receiving recess 202 is formed in a trunnion 200, which extends along the common axis of input and output discs (not shown). Linear bearings 204a and 204b are each interposed between a power roller 206 in the recess 202 and an inner wall of the recess 202. With this construction, the power roller 206 can move in a given direction to effect a parallel displacement thereof. As shown, the power roller 206 comprises a power inner roller 208, a power roller bearing (ball bearing) 210, a power outer roller 212 and a shaft 214 integral with power outer roller 212. In this supporting structure, it tends to occur that under operation, power outer roller 212 is brought into contact with an inner side wall of power roller receiving recess 202 when a vertical load (viz., load applied in the direction of the trunnion pivot axis) is applied to the power roller 206. If such contact occurs, smoothed parallel displacement of power roller 206 may be sacrificed.

SUMMARY OF INVENTION

Considering the above, the applicants have thought out some ideas which are depicted by FIGS. 13 and 14 of the accompanying drawings.

FIG. 13 depicts an idea that may eliminate the weak point of the structure of the 7-198014 publication. As shown, two roller bearings 216 and 218 are each disposed between the inner side wall of power roller receiving recess 202 and power outer roller 212. Due to provision of roller bearings 216 and 218, smoothed parallel displacement of power roller 206 is achieved. Designated by numeral 200a is a pivot axis of the trunnion 200.

FIG. 14 depicts another idea. Also in this idea, two roller bearings 220 and 222 are each disposed between the inner wall of the power roller receiving recess 202 and power outer roller 212. However, as shown, in this idea, each roller bearing 220 or 222 is arranged between an inclined flat portion of the inner wall of the recess 202 and an inclined flat portion of power outer roller 212. Due to provision of such inclined roller bearings 220 and 222, a load in the direction of the rotation axis of power roller 206 as well as a load in the direction of the trunnion pivot axis are effectively supported by trunnion 200, and due to the same reason, smoothed parallel displacement of power roller 206 is achieved.

However, even the power roller supporting structures described hereinabove fail to satisfy manufacturers. That is, it is quite difficult to machine power outer roller 212 because of obstruction by shaft 214 that is integral with roller 212. In fact, due to such obstruction, producing an annular guide groove for power roller bearing (ball bearing) 210 needs a time-consumed and skilled machining technique, which increases the cost of the transmission.

Accordingly, an object of the present invention is to provide a toroidal type continuously variable transmission which is free of the above-mentioned weak points.

According to the present invention, there is provided a toroidal type continuously variable transmission which comprises a power outer roller and a shaft which are produced as separate members. The power outer roller is machined with an annular guide groove for a power roller bearing (ball bearing). Upon assembly, the shaft is coupled with the power outer roller. With this, economical production of power roller supporting structure is achieved while suppressing undesired inclination phenomenon of the shaft.

According to a first aspect of the present invention, there is provided a toroidal type continuously variable transmission which comprises input and output discs coaxially arranged; a pair of power rollers, each being operatively disposed between the input and output discs and including a power inner roller which is frictionally engaged with the input and output discs, a power outer roller which receives an axial load applied to the power inner roller from the input and output discs, a ball bearing which is operatively interposed between the power inner and outer rollers and a shaft which receives a radial load applied to the power inner roller from the input and output discs, a pair of trunnions rotatably supporting the power rollers respectively, each trunnion being connected to a transmission case in a manner to pivot about its pivot axis and having a power roller receiving recess for receiving therein corresponding one of the power rollers; and first roller bearings, each being operatively interposed between an inner wall of the power roller receiving recess of the trunnion and a back side of the power roller, so that the power roller is movable relative to the trunnion in a direction perpendicular to both a pivot axis of the trunnion and a rotation axis of the power roller, wherein the shaft is a one-body member comprises a first shaft portion on which the power outer roller is coaxially and tightly disposed and a second shaft portion on which the power inner roller is coaxially and rotatably disposed.

According to a second aspect of the present invention, there is provided a toroidal type continuously variable transmission which comprises input and output discs coaxially arranged; a pair of power rollers, each being operatively disposed between the input and output discs and including a power inner roller which is frictionally engaged with the input and output discs, a power outer roller which receives an axial load applied to the power inner roller from the input and output discs, a ball bearing which is operatively interposed between the power inner and outer rollers and a shaft which receives a radial load applied to the power inner roller from the input and output discs, a pair of trunnions rotatably supporting the power rollers respectively, each trunnion being connected to a transmission case in a manner to pivot about its pivot axis and having a power roller receiving recess for receiving therein corresponding one of the power rollers; and first roller bearings, each being operatively interposed between an inner wall of the power roller receiving recess of the trunnion and a back side of the power roller, so that the power roller is movable relative to the trunnion in a direction perpendicular to both a pivot axis of the trunnion and a rotation axis of the power roller, wherein the shaft is a one-body member comprises a first shaft portion on which the power outer roller is coaxially and tightly disposed and a second shaft portion on which the power inner roller is coaxially and rotatably disposed, wherein an inner wall of the power roller receiving recess is formed with inclined flat portions against which the first roller bearings abut, and wherein the power outer roller comprises a first surface formed with an annular guide groove which operatively receives the ball bearing, and a second surface formed with inclined flat portions which abut against the first roller bearings respectively.

According to a third aspect of the present invention, there is provided a toroidal type continuously variable transmission which comprises input and output discs coaxially arranged; a pair of power rollers, each being operatively disposed between the input and output discs and including a power inner roller which is frictionally engaged with the input and output discs, a power outer roller which receives an axial load applied to the power inner roller from the input and output discs, a ball bearing which is operatively interposed between the power inner and outer rollers and a shaft which receives a radial load applied to the power inner roller from the input and output discs, a pair of trunnions rotatably supporting the power rollers respectively, each trunnion being connected to a transmission case in a manner to pivot about its pivot axis and having a power roller receiving recess for receiving therein corresponding one of the power rollers; and first roller bearings, each being operatively interposed between an inner wall of the power roller receiving recess of the trunnion and a back side of the power roller, so that the power roller is movable relative to the trunnion in a direction perpendicular to both a pivot axis of the trunnion and a rotation axis of the power roller, wherein the shaft is a one-body member comprises a first shaft portion on which the power outer roller is coaxially and tightly disposed and a second shaft portion on which the power inner roller is coaxially and rotatably disposed, and wherein the first shaft portion is integrally formed with a flange portion which has a front flat surface which abuts against a rear flat surface of the power outer roller and a rear surface which is formed with inclined flat portions which abut against the first roller bearings respectively.

DETAILED DESCRIPTION OF EMBODIMENTS

In the following, various embodiments of the present invention will be described with reference to the accompanying drawings.

For ease of understanding, directional terms, such as, right, left, upper, lower, rightward, etc., are contained in the following description. However, such terms are to be understood with respect to only a drawing or drawings on which corresponding part or portion is illustrated.

Figure 1:
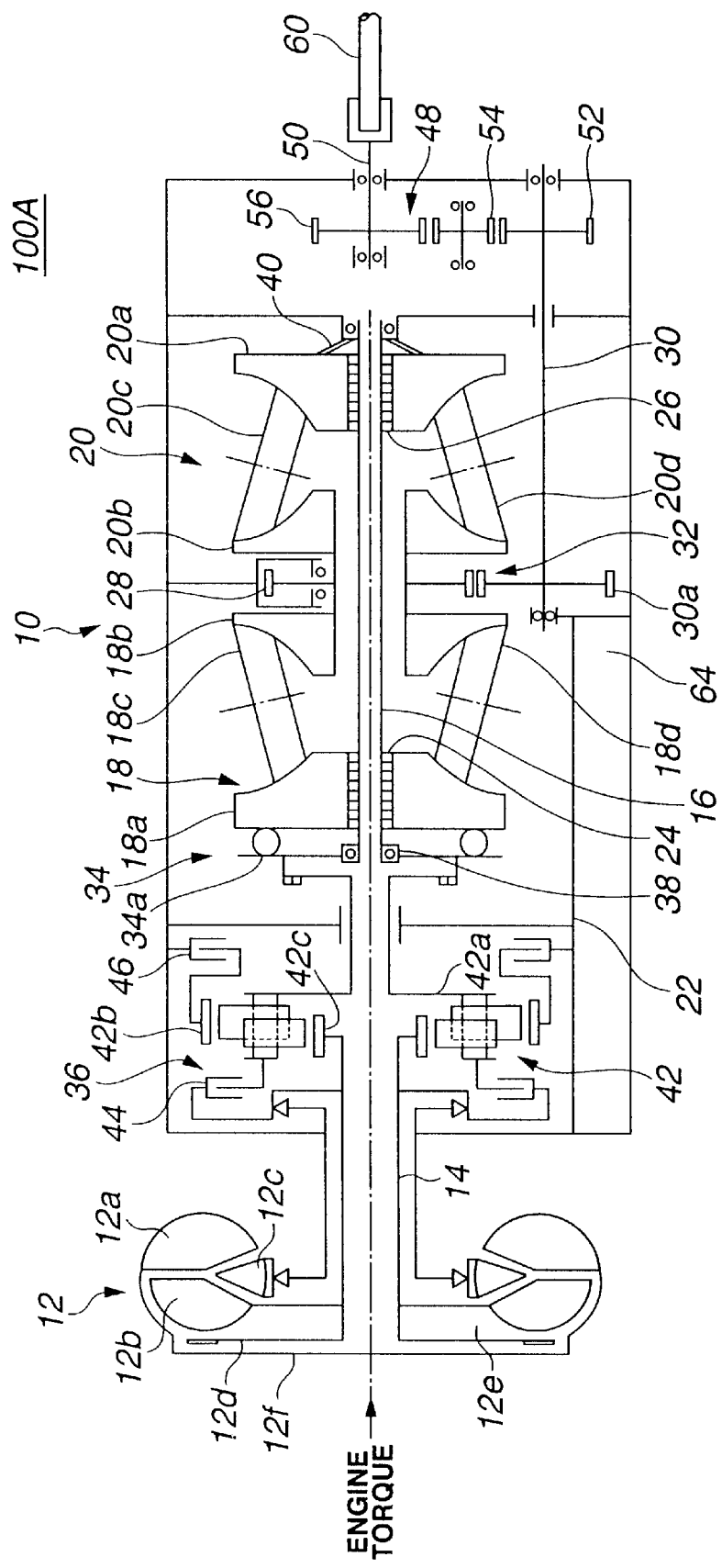
FIG. 1 is a schematic view illustrating entire construction of a toroidal type continuously variable transmission which is a first embodiment of the present invention.

Referring to FIG. 1, there is schematically shown the entire construction of a toroidal type continuously variable transmission 100A which is a first embodiment of the present invention.

As shown, transmission 100A is equipped with a torque converter 12 through which a torque of an engine (not shown) is inputted to an input section of the transmission.

Torque converter 12 comprises generally a pump impeller 12a, a turbine runner 12b, a stator 12c, a lock-up clutch 12d, an apply-side fluid chamber 12e and a release-side fluid chamber 12f. Passed through a center of torque converter 12 is an input shaft 14.

Input shaft 14 is connected to a forward/back switch mechanism 36 which is equipped with a planetary gear unit 42, a forward clutch 44 and a back clutch 46. Planetary gear unit 42 comprises generally a sun gear 42c, a ring gear 42b and a pinion carrier 42a carrying two pinions meshed with both sun gear 42c and ring gear 42b.

Pinion carrier 42a is connected to a torque transmission shaft 16 around which first and second continuously variable transmission units 18 and 20 are arranged in tandem. As shown, these transmission units 18 and 20 are installed in a downstream section of a transmission case 22. Transmission case 22 has a base 64 in which a control valve system is installed.

First continuously variable transmission unit 18 comprises input and output discs 18a and 18b which have mutually facing toroidal surfaces, a pair of power rollers 18c and 18d which are interposed between input and output discs 18a and 18b and arranged symmetrically with respect to torque transmission shaft 16, and a pair of trunnions 17a and 17b (see FIG. 2) which rotatably support power rollers 18c and 18d respectively. Similar to this, second continuously variable transmission unit 20 comprises input and output discs 20a and 20b which have mutually facing toroidal surfaces, a pair of power rollers 20c and 20d which are interposed between input and output discs 20a and 20b and arranged symmetrically with respect to torque transmission shaft 16 and a pair of trunnions 27a and 27b (see FIG. 2) which rotatably support power rollers 20c and 20d respectively.

As shown in FIG. 1, first and second transmission units 18 and 20 are arranged in a back-to-back connecting manner with their output discs 18b and 20b facing to each other. Due to a loading cam device 34 which produces a pressing force in accordance with an input torque applied thereto from torque converter 12, input disc 18a of first transmission unit 18 is biased in a rightward direction in the drawing. Loading cam device 34 has a loading cam 34a supported by torque transmission shaft 16 through a bearing 38. Input disc 20a of second transmission unit 20 is biased in a leftward direction by a dish spring 40.

As will be apparent hereinafter, power rollers 18c, 18d, 20c and 20d are subjected to inclination in accordance with a needed transmission ratio, so that rotation of input discs 18a and 20a is transmitted to output discs 18b and 20b while continuously changing the speed thereof.

Output discs 18b and 20b are spline-connected with an output gear 28 which is rotatable about torque transmission shaft 16, so that a torque transmitted to output discs 18b and 20b is transmitted through output gear 28 to a gear 30a connected to an output shaft 30 (viz., countershaft). Output gear 28 and gear 30a constitute a torque transmission mechanism 32. Gears 52 and 56 disposed on output shafts 30 and 50 and an idler gear 54 meshed with gears 52 and 56 constitute transmission mechanism 48. Output shaft 50 is connected to a propeller shaft 60.

In the following, with the aid of FIG. 2, a speed change control device will be described in detail, which inclines power rollers 18c, 18d, 20c and 20d in accordance with a needed transmission ratio.

Figure 2:
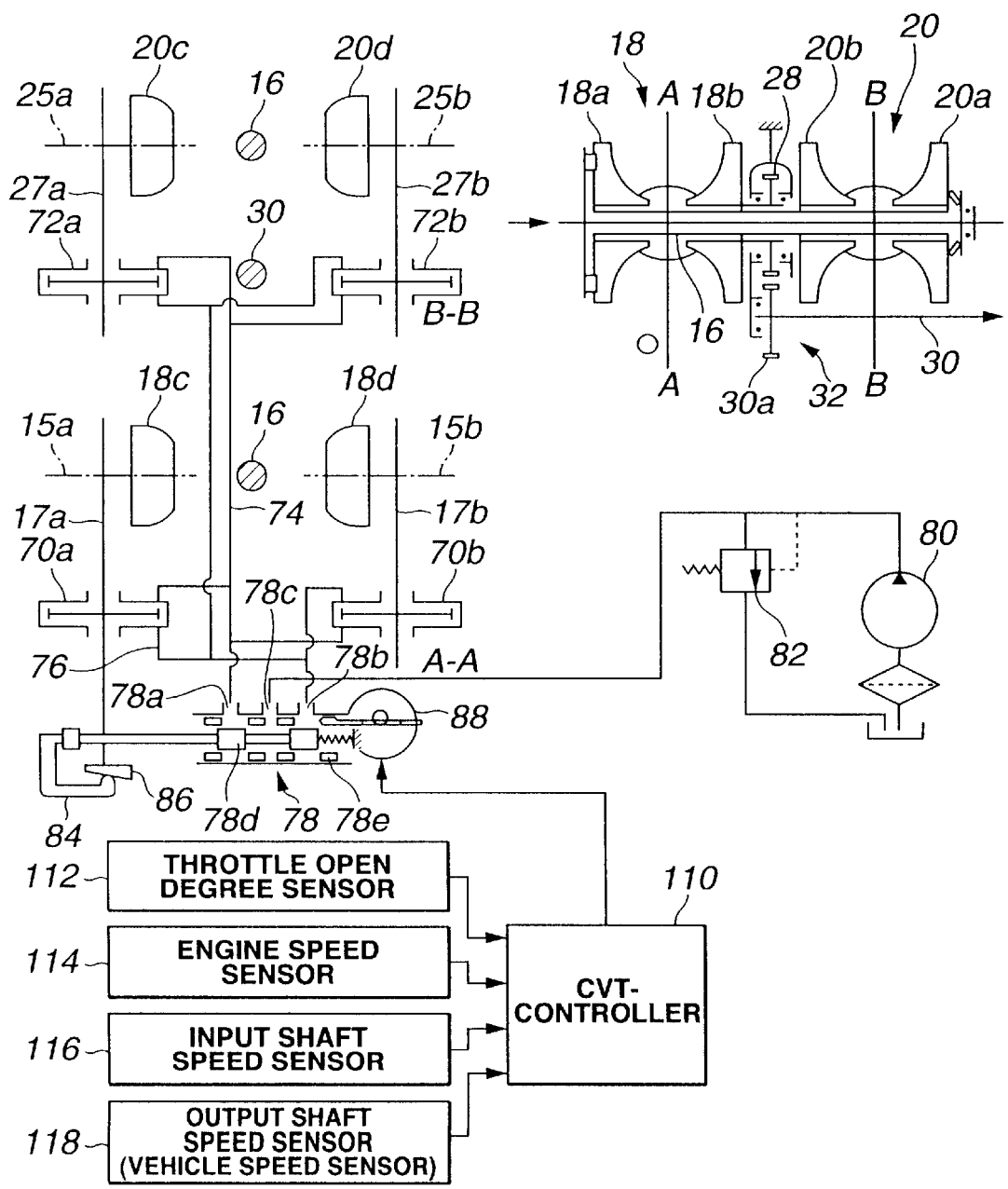
FIG. 2 is a schematic view illustrating a speed change control system employed in the transmission of the first embodiment.

As is seen from FIG. 2, each power roller 18c, 18d, 20c or 20d is supported on one end of corresponding trunnion 17a, 17b, 27a or 27b and rotatable about a power roller rotation axis 15a, 15b, 25a or 25b. The other end of trunnion 17a, 18b, 27a or 27b is equipped with a servo-piston 70a, 70b, 72a or 72b as a hydraulic actuator, which moves trunnion 17a, 17b, 27a or 27b in an axial direction to incline power roller 18c, 18d, 20c or 20d.

To operate servo-pistons 70a, 70b, 72a and 72b, there is employed a hydraulic control system which comprises a higher pressure hydraulic passage 74 which connects to higher pressure operating chambers of the pistons, a lower pressure hydraulic passage 76 which connects to lower pressure operating chambers of the pistons, and a speed change control valve 78 which has a port 78a connected to higher pressure hydraulic passage 74 and another port 78b connected to lower pressure hydraulic passage 76. Speed change control valve 78 has further a line pressure port 78c to which a line pressure is applied from a hydraulic source which comprises an oil pump 80 and a relief valve 82. Speed change control valve 78 has a speed change spool 78d which is incorporated with a lever 84 and a precision cam 86 to sense an axially moving direction and an inclination direction of trunnion 17a for controlling speed change control valve 78 in a feedback controlling manner. A sleeve 78e of speed change control valve 78 is axially moved by a step motor 88.

A CVT-controller 110 is provided for controlling step motor 88. For this controlling, information signals from a throttle open degree sensor 112, an engine speed sensor 114, an input shaft speed sensor 116 and an output shaft speed sensor (viz., vehicle speed sensor) 118 are fed to controller 110.

In the following, with the aid of FIG. 3, power roller supporting structures for power rollers 18c, 18d, 20c and 20d will be described in detail.

Since these supporting structures for the four power rollers are substantially the same in construction, only the structure for power roller 18c will be explained for facilitation of the description.

Trunnion 17a of power roller 18c is connected to transmission case 22 (see FIG. 1) in a manner to turn about a trunnion pivot axis 19a which is perpendicular to power roller rotation axis 15a. Trunnion 17a has at its upper portion a power roller receiving recess 90 for receiving power roller 18c.

Figure 3:
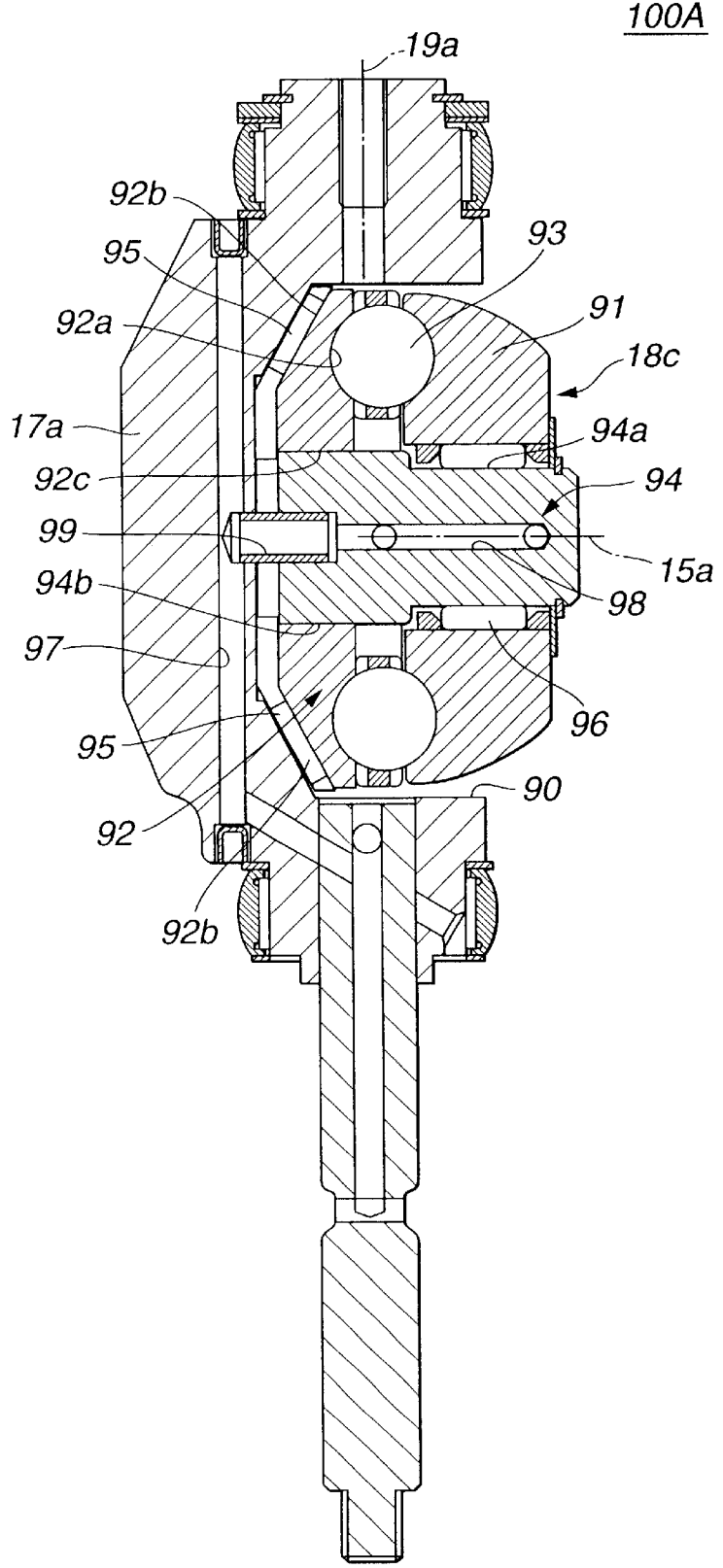
FIG. 3 is a vertically sectioned view of a power roller supporting structure employed in the transmission of the first embodiment.

As is seen from FIG. 3, power roller 18c comprises a power inner roller 91 which frictionally contacts both input and output discs 18a and 18b, a power outer roller 92 which receives or holds an axial load that is applied to inner roller 91 from input and output discs 18a and 18b, a ball bearing 93 (viz., power roller bearing) which is operatively interposed between inner and outer rollers 91 and 92 and a shaft 94 which receives and holds a radial load that is applied to inner roller 91 from input and output discs 18a and 18b.

As shown, two roller bearings 95 are arranged between trunnion 17a and power outer roller 92 at opposite positions with respect to power roller rotation axis 15a. For arranging these roller bearings 95, two inclined flat spaces are defined at the opposite positions between an inner wall of power roller receiving recess 90 of trunnion 17a and a back surface of power outer roller 92. Due to provision of these roller bearings 95, power roller 18c can move straightly relative to trunnion 17a in a direction perpendicular to both trunnion pivot axis 19a and power roller rotation axis 15a.

Shaft 94 is shaped into a stepped structure, comprising a smaller diameter shaft portion 94a on which power inner roller 91 is rotatably disposed through a roller bearing 96, and a larger diameter shaft portion 94b onto which power outer roller 92 is tightly disposed.

Power outer roller 92 comprises a front surface formed with an annular guide groove 92a operatively receiving ball bearing 93, a rear surface formed with inclined flat portions 92b abutting against roller bearings 95 and a cylindrical bore 92c formed in a center portion thereof for tightly receiving larger diameter shaft portion 94b (or first shaft portion) of shaft 94.

Power outer roller 92 and shaft 94 are separate members. Upon mounting them to trunnion 17a, press-fitting, bonding or shrink-fitting technique is used for securing larger diameter shaft portion 94b to bore 92c of power outer roller 92.

In the drawing, denoted by numeral 97 is a first oil passage formed in trunnion 17a, 98 is a second oil passage formed in shaft 94, and 99 is a pipe for flowing a lubrication oil from first oil passage 97 to second oil passage 98. The lubrication oil led to second oil passage 98 is applied to ball bearing 93 and roller bearings 96 through radial oil passages (not shown) formed in shaft 94.

In the following, operation of toroidal type continuously variable transmission 100A of the first embodiment will be described.

[Speed Change Control]

In toroidal type continuously variable transmission 100A, the speed change control is carried out by turning trunnion 17a (and trunnions 17b, 27a and 27b) about pivot axis 19a (and the corresponding pivot axes) thereof to incline power roller 18c (and power rollers 18d, 20c and 20d) relative to the input and output discs.

That is, as is understood from FIG. 2, when, upon receiving an instruction signal from CVT-controller 110, step motor 88 is energized to slide sleeve 78e of speed change control valve 78 to a desired position, one of two servo piston chambers of each servo-piston 70a, 70b, 72a or 72b is fed with the hydraulic fluid and the other of the two servo piston chamber has the hydraulic fluid discharged therefrom, so that trunnion 17a, 17b, 27a or 27b is applied with a certain force in the direction of trunnion pivot axis 19a.

With this, the rotation center of each power roller 18c, 18d, 20c or 20d becomes offset relative to the corresponding rotation axis of input and output discs 18a and 18b (or 20a and 20b). Upon this offsetting movement, power roller 18c, 18d, 20c or 20d is inclined due to a side slip force generated at a contacting area between power roller 18c, 18d, 20c or 20d and input and output discs 18a and 18b (or 20a and 20b). The inclination movement and the offsetting movement are transmitted through precision cam 86 and lever 84 to speed change spool 78d, causing spool 78d to stop at a position where a balance is effected between the force from lever 84 and that from step motor 88. When spool 78d has come to the given position, that is, when the power roller has taken a given inclination angle, the displacement given to trunnion 17a, 17b, 27a or 27b is returned to the common rotation axis of input and output discs 18a and 18b (or 20a and 20b) and the inclination movement of power roller 18c, 18d, 20c or 20d is stopped. The transmission ratio is determined by the inclination angle of power rollers 18c, 18d, 20c and 20d.

[Sliding Operation of Power Rollers]

In the following, the sliding operation of power rollers 18c, 18d, 20c and 20d will be described with reference to FIG. 3.

Since these four power rollers exhibit substantially the same movement, only operation of power roller 18c will be described for facilitation of description.

When power roller 18c is applied with loads in lateral directions from input and output discs 18a and 18b, two roller bearings 95 arranged at the back side of power roller 18c are forced to permit a movement of power roller 18c in lateral directions relative to trunnion 17a. Even if the loads applied to power roller 18c contain a load in an axial direction and a load in a vertical direction, the vertically spaced arrangement of two roller bearings 95 assures a satisfied support for such loads by trunnion 17a, and thus undesired contacting between an inner wall of power roller receiving recess 90 and power roller 18c is suppressed assuring a smoothed lateral movement of power roller 18c relative to trunnion 17a.

Accordingly, even when the distance between input and output discs 18a and 18b is varied due to the work of loading cam device 34, the sliding operation of power roller 18c can absorb or cope with the distance change between two discs 18a and 18b. Furthermore, even when input and output discs 18a and 18b are subjected to deformation and/or misalignment which would occur upon assembly, the sliding operation of power roller 18c can absorb or cope with such undesired phenomena.

[Manufacturing and Assembling Step]

Figure 12:
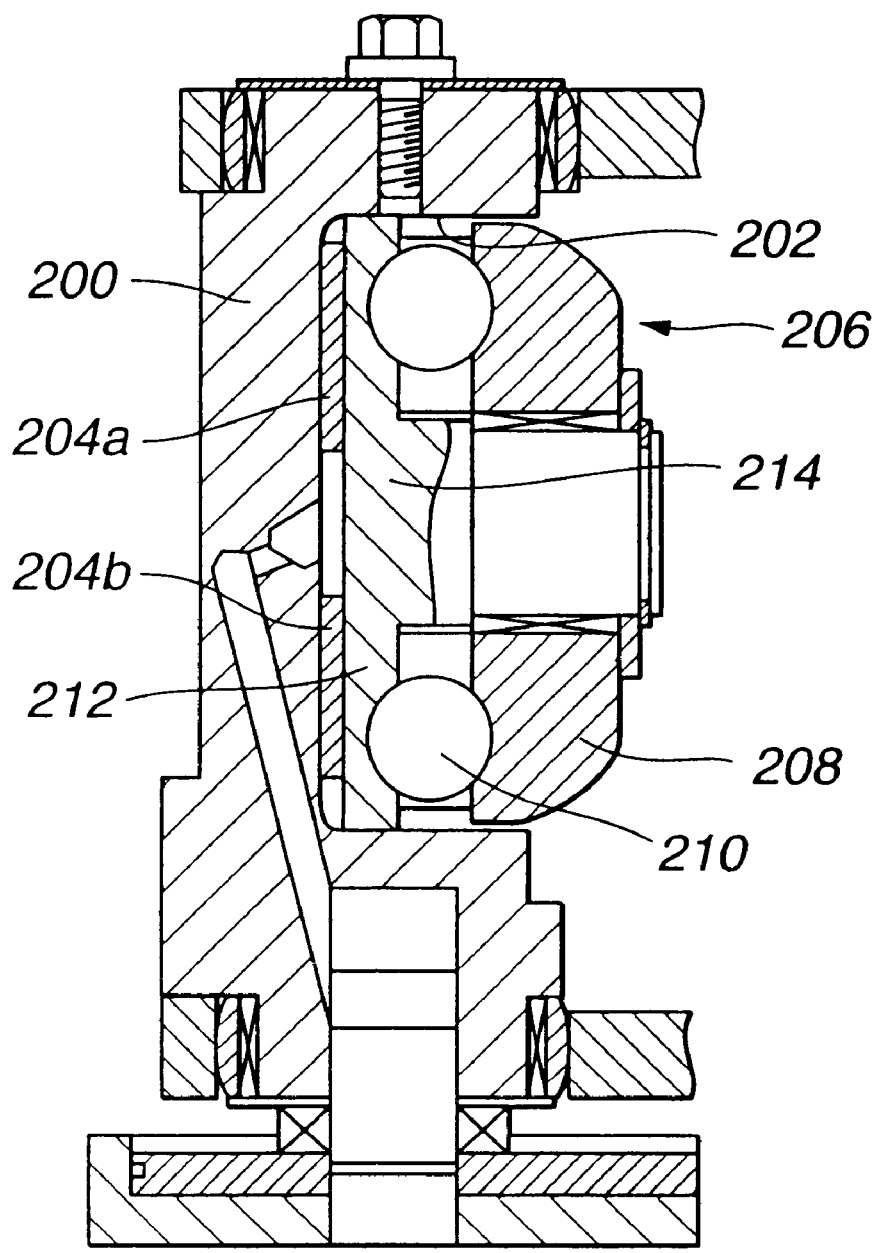
FIG. 12 is a vertically sectioned view of a power roller supporting structure employed in a toroidal type continuously variable transmission of Related Art.
Figure 13:
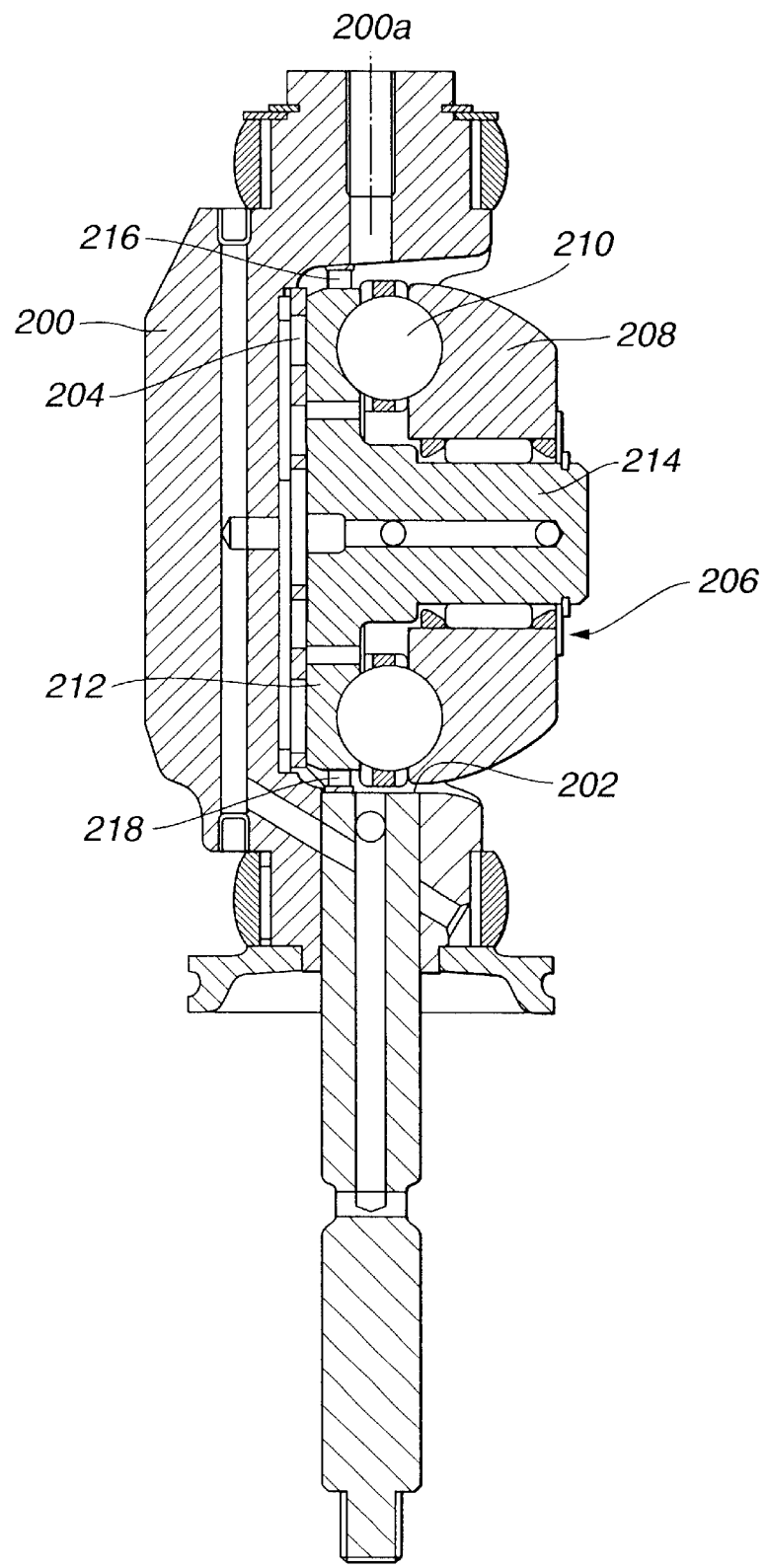
FIGS. 13 and 14 are views similar to FIG. 3, but depicting less preferred ideas thought out by the applicants.
Figure 14:
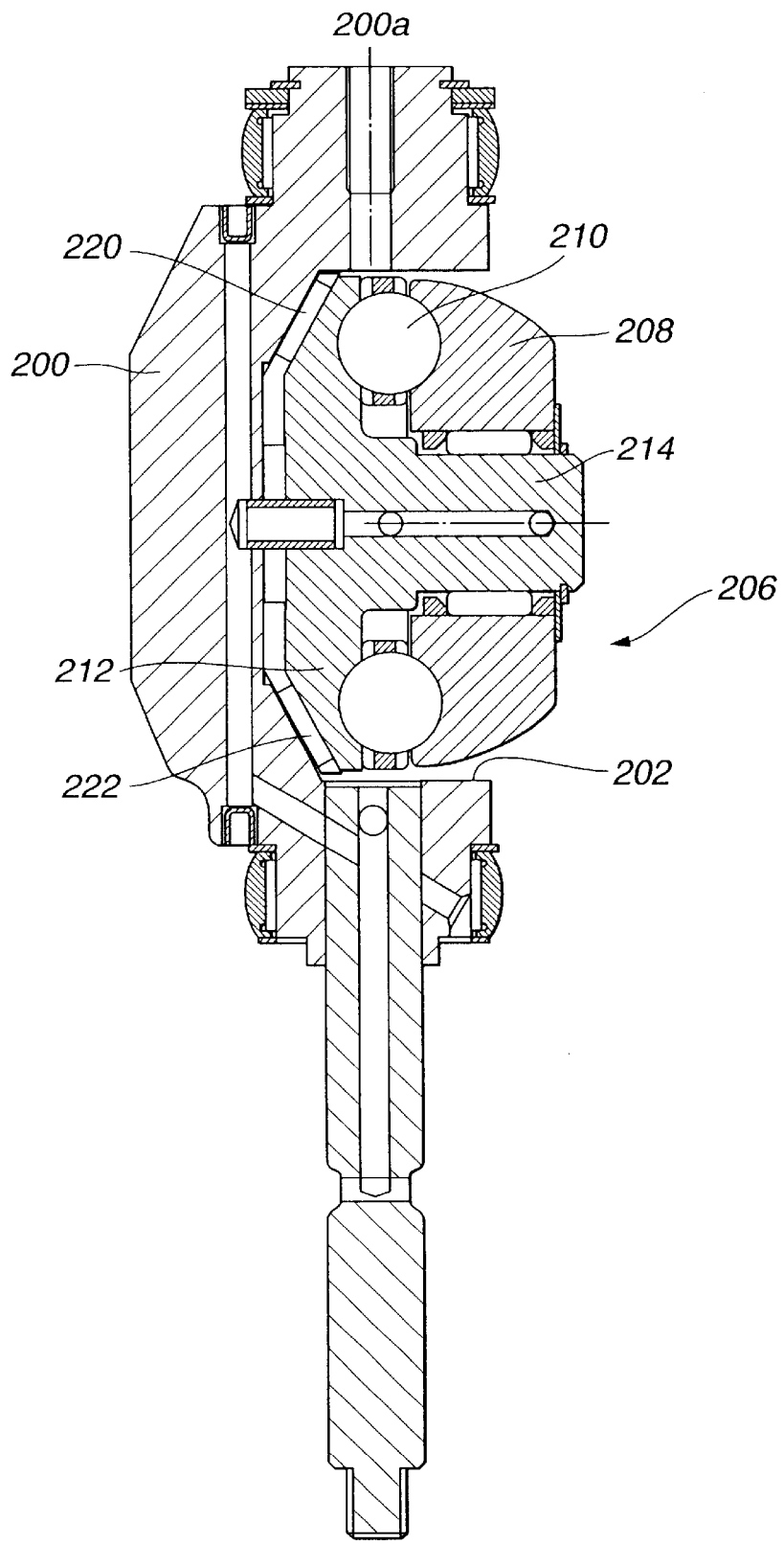

As is described hereinabove and shown in FIG. 3, power roller 18c generally consists of power inner roller 91, power outer roller 92, ball bearing 93 and shaft 94. That is, two load receiving sections are separately constructed, one being the power outer roller 92 which receives an axial load applied to power inner roller 91 from input and output discs 18a and 18b through ball bearing 93, and the other being the shaft 94 which receives a radial load applied to power inner roller 91 from input and output discs 18a and 18b. Power outer roller 92 and shaft 94 are machined separately. Thus, grinding of annular guide groove 92a of power outer roller 92 is easily carried out. In a conventional structure (see FIG. 12) wherein power outer roller is integral with a shaft, grinding such guide groove needs a difficult and time-consumed work due to interference by the integral shaft. In fact, during the grinding process, the integral shaft tends to interfere with a grinding tool handled by an operator.

Upon assembly to trunnion 17a, power outer roller 92 and shaft 94 are coupled, and thus, undesirable inclination of shaft 94, which would be caused by loads applied to power inner roller 91 from input and output discs 18a and 18b, is suppressed, and thus, torque shift and deformation of power outer roller 92 are suppressed or at least minimized.

As is described hereinabove, in the power roller supporting structure of first embodiment 100A, the two parts, that are, power outer roller 92 having annular guide groove 92a for ball bearing 93 and shaft 94 are constructed separately, and upon assembly to trunnion 17a, these two parts 92 and 94 are coupled together. The two parts 92 and 94 can be easily produced at a lower cost and when these parts are coupled, undesired inclination of shaft 94 can be avoided.

In the following, power roller supporting structures employed in second, third, fourth, fifth, sixth, seventh, eighth and ninth embodiments 100B, 100C, 100D, 100E, 100F, 100G, 100H and 100I will be described with reference to the corresponding drawings.

Since the power roller supporting structures of these embodiments 100B to 100I are similar to that of the above-mentioned first embodiment 100A, only portions different from those of the first embodiment 100A will be described in detail for facilitating description. Substantially same parts are denoted by the same numerals.

Figure 4:
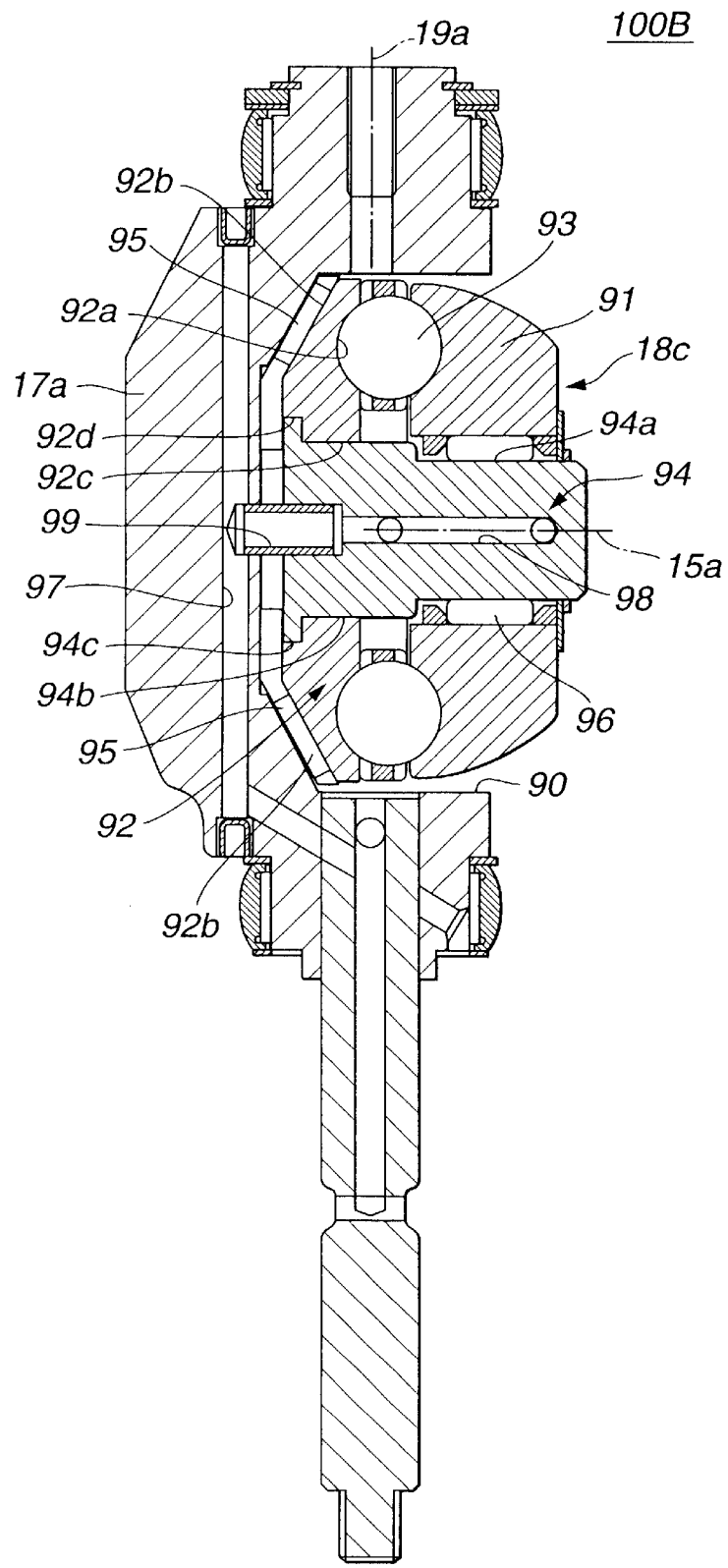
FIGS. 4 to 11 are views similar to FIG. 3, but showing power roller supporting structures employed in second, third, fourth, fifth, sixth, seventh, eighth and ninth embodiments of the present invention, respectively.

Referring to FIG. 4, there is shown a power roller supporting structure employed in a second embodiment 100B of the present invention.

As shown in the drawing, in this power roller supporting structure, larger diameter shaft portion 94b is formed at a left end thereof with an annular flange portion 94c which is intimately received in an annular groove 92d formed in power outer roller 92. Also in this power roller supporting structure, power outer roller 92 and shaft 94 are produced separately, and then, that is, upon assembly to trunnion 17a, these two parts 92 and 94 are coupled, like in case of the above-mentioned first embodiment 100A. For the coupling, press-fitting, bonding or shrink-fitting technique is used.

In the power roller supporting structure of the second embodiment 100B, substantially same advantages as those of the above-mentioned first embodiment 100A are obtained, and because of addition of flange portion 94c engaged with annular groove 92, the coupling between the two parts 92 and 94 is much tightly achieved.

Figure 5:
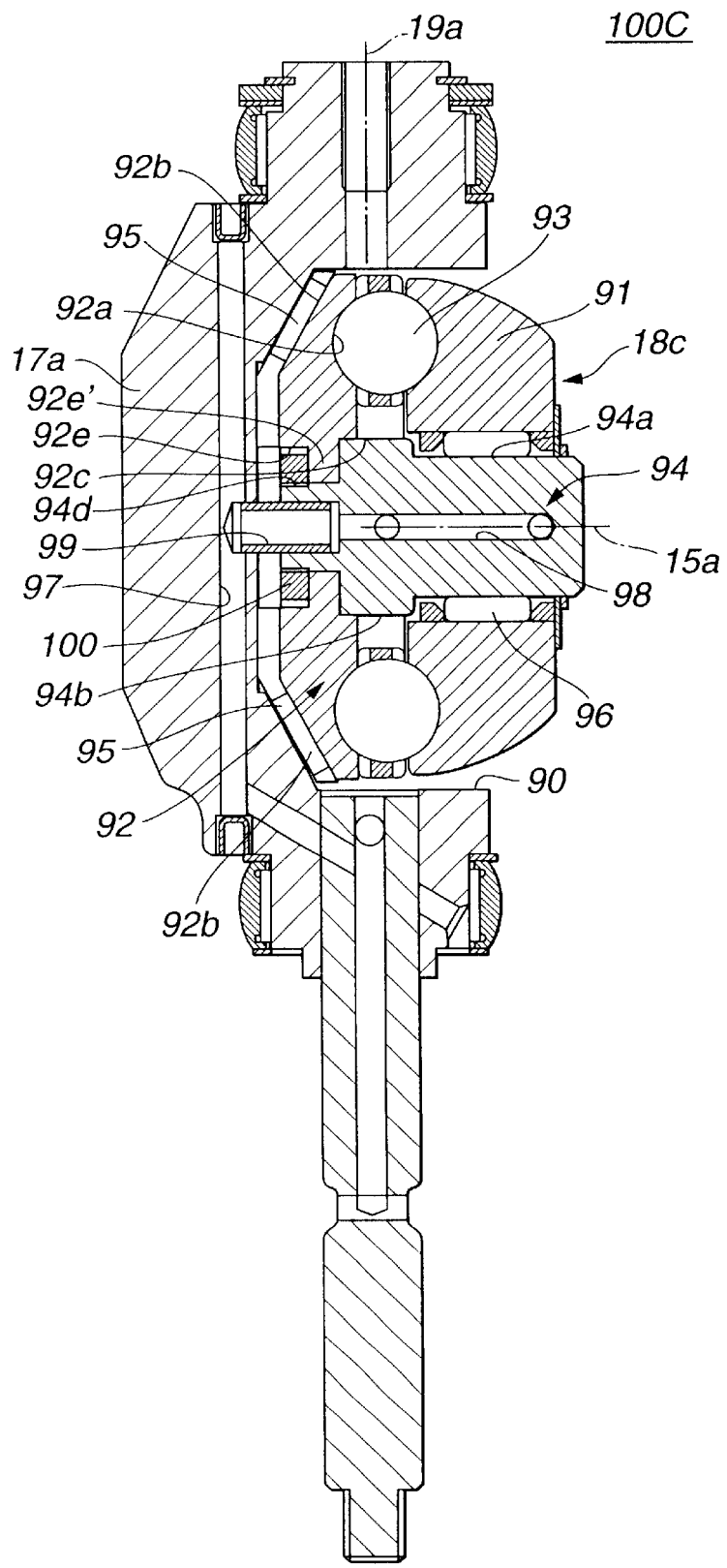

Referring to FIG. 5, there is shown a power roller supporting structure employed in a third embodiment 100C of the present invention.

In this power roller supporting structure, the coupling between two parts 92 and 94 is detachably made by a connecting nut. That is, as shown in the drawing, shaft 94 is formed with an externally threaded smaller diameter left portion 94d and the power outer roller 92 is formed with an annular recess 92e that surrounds the smaller diameter left portion 94d of shaft 94. Due to provision of the annular recess 92e, an annular flange 92e' of the power outer roller 92 is formed at a right side of the annular recess 92e. Upon assembly to trunnion 17a, a nut 100 received in annular recess 92e is turned in a fastening direction to engage with the external thread of left portion 94d of shaft 94. With this, nut 100 is strongly pressed against annular flange 92e' of power outer roller 92 thereby to achieve the tight coupling between two parts 92 and 94.

In the power roller supporting structure of the third embodiment 100C, substantially same advantages as those of the first embodiment 100A are also obtained, and in addition to these advantages, an additional advantage is obtained wherein the coupling between two parts 92 and 94 is much readily carried out as compared with the cases of the first and second embodiments 100A and 100B.

Figure 6:
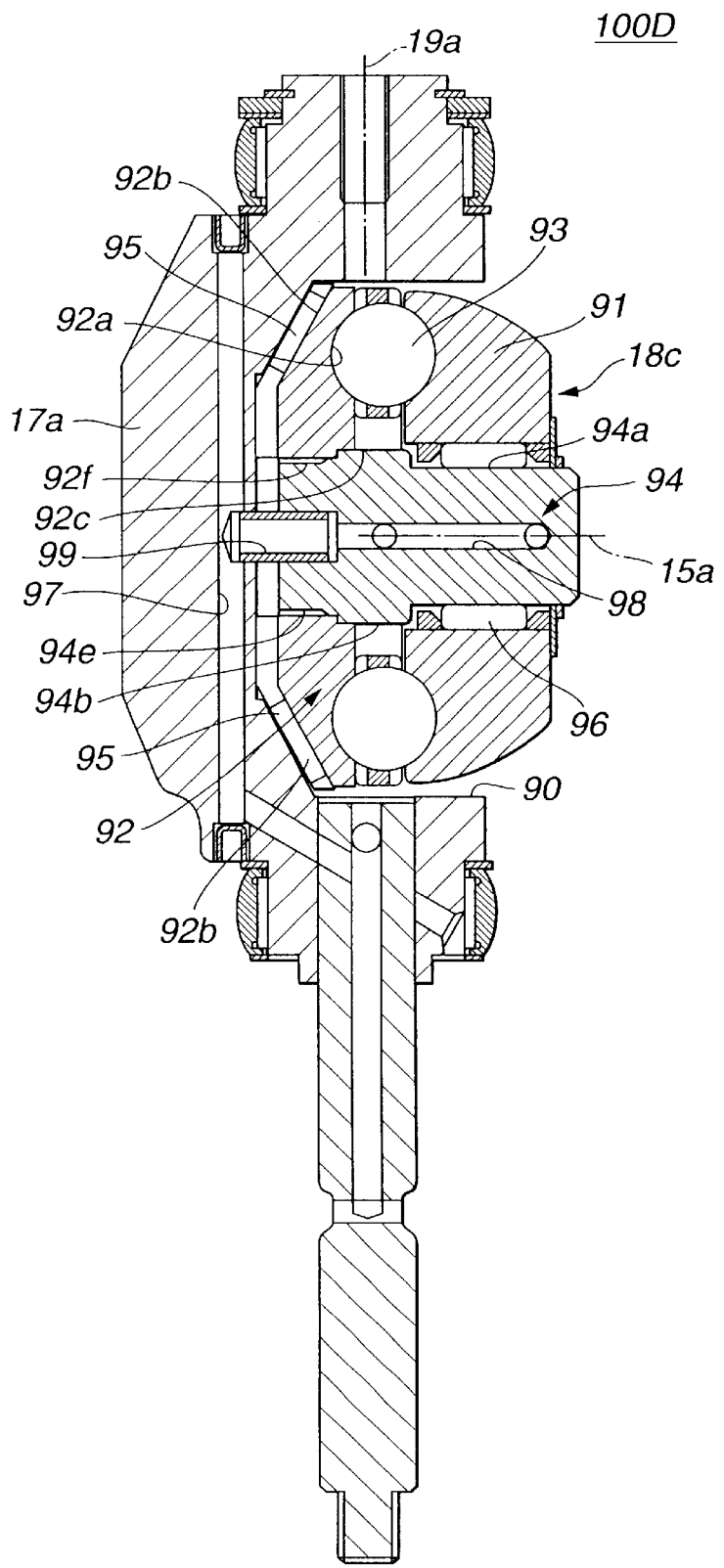

Referring to FIG. 6, there is shown a power roller supporting structure employed in a fourth embodiment 100D of the present invention.

In this power roller supporting structure, the coupling between two parts 92 and 94 is detachably made by a meshed engagement. That is, as shown in the drawing, shaft 94 is formed on its left end with an external thread 94e and power outer roller 92 is formed on an inner surface of cylindrical bore 92c thereof with an internal thread 92f. Upon assembly to trunnion 17a, internal thread 92f of power outer roller 92 is tightly engaged with external thread 94e of the left end of shaft 94.

In the power roller supporting structure of this embodiment 100D, in addition to the advantages of the first embodiment 100A, an additional advantage is obtained wherein the coupling between two parts 92 and 94 is achieved with reduced number of parts.

Figure 7:
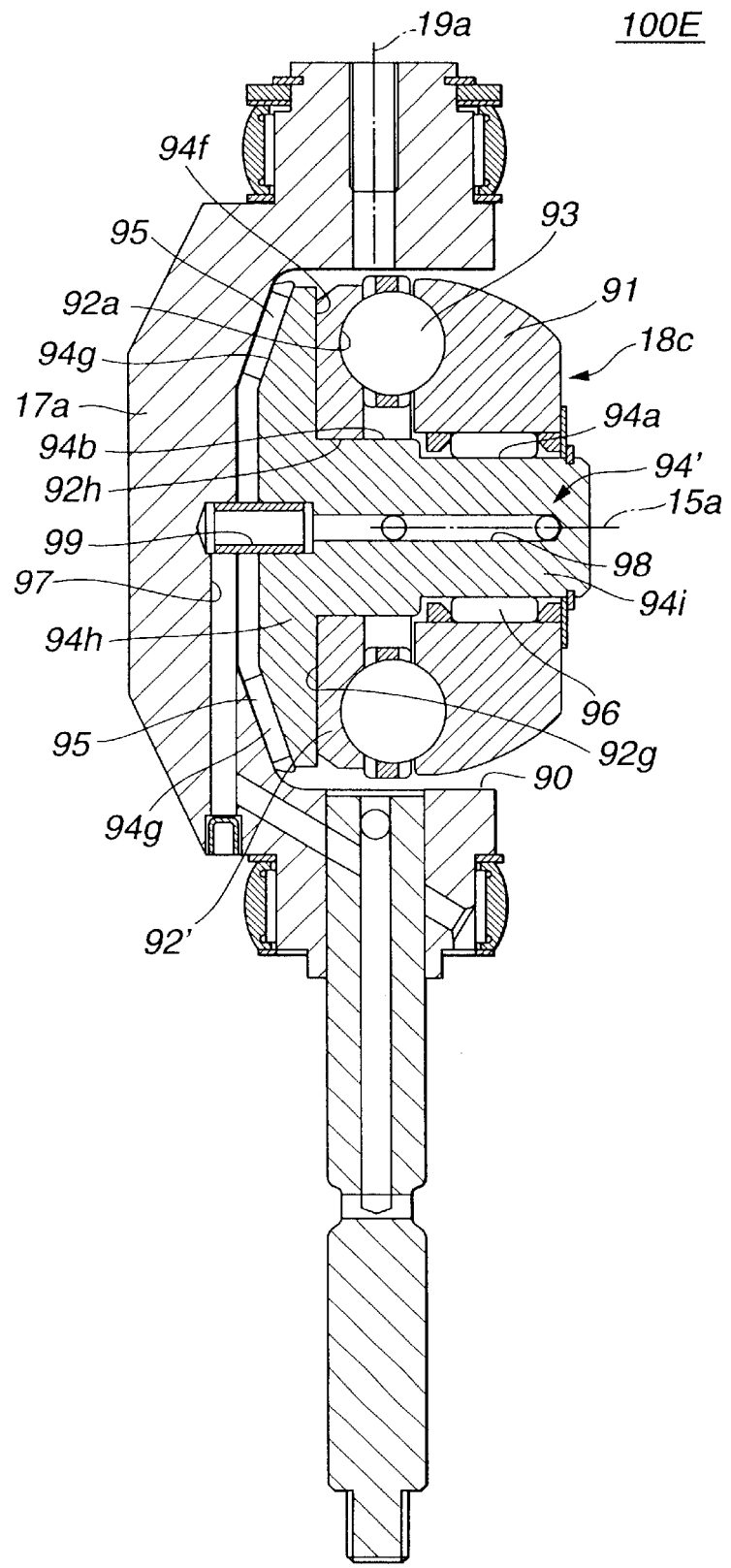

Referring to FIG. 7, there is shown a power roller supporting structure employed in a fifth embodiment 100E of the present invention.

As shown, in the power roller supporting structure of this embodiment, a power outer roller 92' is shaped into a flat annular member, and a shaft 94' is shaped to have at its left end an enlarged flange portion 94h which holds the power outer roller 92'. In other words, shaft 94' comprises mutually integrated two portions, one being a power roller holding portion or enlarged flange portion 94h which has a flat front (or right) surface abutting against power outer roller 92' and a rear (or left) race surface 94g abutting against roller bearings 95, and the other being a shaft portion 94i which rotatably support power inner roller 91. Power outer roller 92' is constructed to have at its front (or right) side an annular guide groove 92a which operatively receives ball bearing 93, at its rear (or left) side a flat surface 92g which is held by power roller holding portion 94h of shaft 94' and at its center portion an enlarged circular opening 92h in which shaft portion 94i of shaft 94' is intimately received. That is, two parts 92' and 94' are separated at a position quite different from positions in case of the parts 92 and 94 of the above-mentioned first to fourth embodiments 100A to 100D.

In the power roller supporting structure of this fifth embodiment 100E, power outer roller 92' and shaft 94' are produced separately. Thus, the advantages of the first embodiment 100A are also possessed by the power roller supporting structure of this fifth embodiment 100A. That is, grinding of annular guide groove 92a of power outer roller 92' is easily made unlike the case of the conventional structure (see FIG. 12). Furthermore, due to provision of power roller holding portion 94h which tightly abuts against power outer roller 92', undesired inclination of shaft 94', which would be caused by the load applied to power inner roller 91 from input and output discs 18a and 18b, can be avoided and thus, the power roller supporting structure can have a longer life. Furthermore, in this embodiment 100E, because of its simple construction, power outer roller 92' can be easily produced. In other words, roller 9 can be precisely constructed at a lower cost. Furthermore, for the same reason, the durability of power outer roller 92' is increased.

Figure 8:
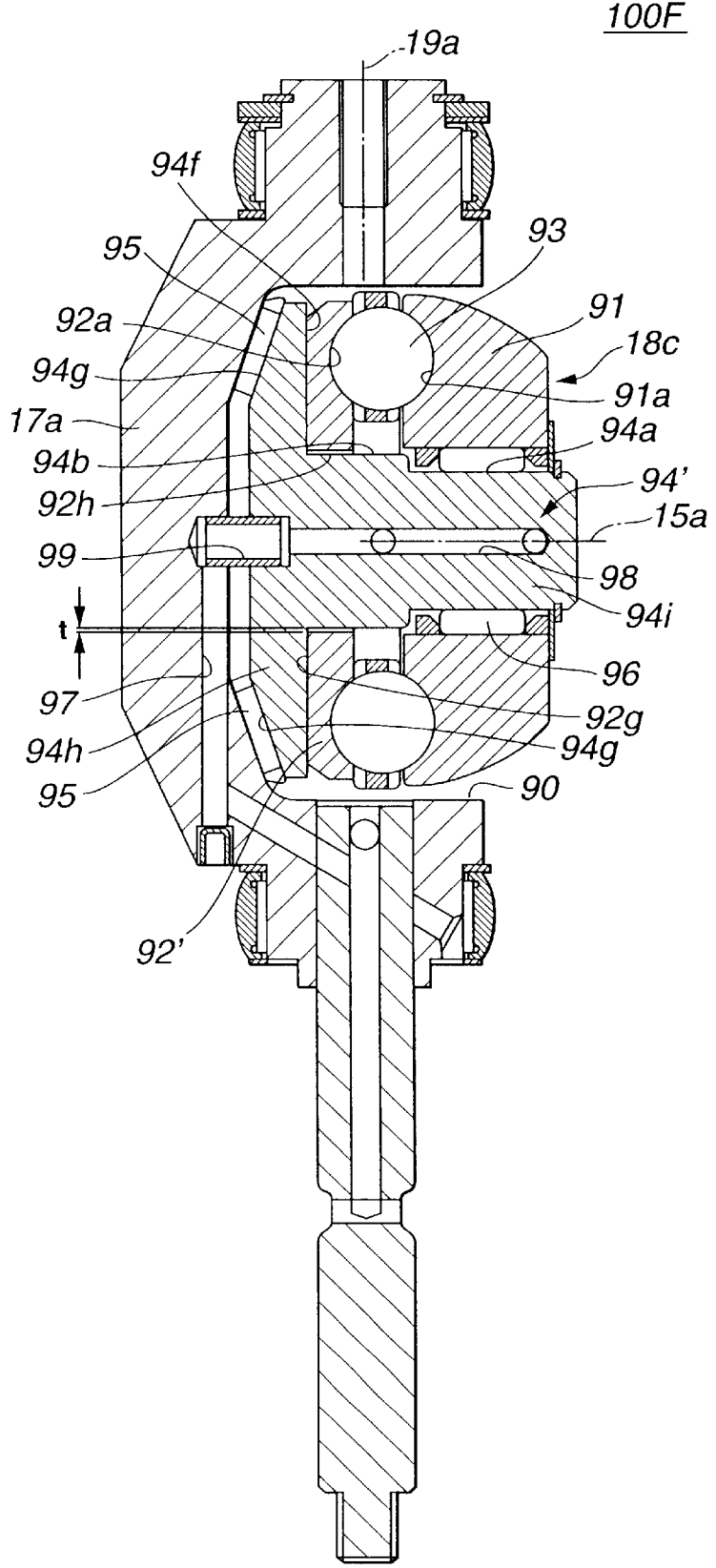

Referring to FIG. 8, there is shown a power roller supporting structure employed in a sixth embodiment 100F of the present invention.

As shown, the power roller supporting structure of this embodiment 100F is similar to that of the above-mentioned fifth embodiment 100E. However, in the device of this embodiment 100E, between larger diameter shaft portion 94b of shaft 94' and an inner surface of circular opening 92h of power outer roller 92', there is defined or left an annular clearance "t".

Due to provision of annular clearance "t", the following advantageous operations are obtained in the sixth embodiment 100F in addition to the advantages possessed by the fifth embodiment 100E.

First, power outer roller 92' is permitted to have a relative shifting operation to power inner roller 91. That is, under power transmission between each of input and output discs 18a and 18b and power inner roller 91, there is produced a force in the direction of the trunnion pivot axis 19a. Due to this force, power outer roller 92' can smoothly follow power inner roller 91 even if power inner roller 91 is shifted toward trunnion pivot axis 19a. That is, due to provision of annular clearance "t", power outer roller 92' and power roller holding portion 94h are permitted to make a relative shifting, and thus, when power inner roller 91 is shifted, power outer roller 92' can follow the shifting.

Second, power outer roller 92' is permitted to have a relative rotation operation to power inner roller 91. When the force produced upon power transmission between input or output disc 18a or 18b and power inner roller 91 is transmitted through ball bearing 93 to power outer roller 92' and thus when the force applied to power outer roller 92' includes a force that rotates power outer roller 92', power outer roller 92' is shifted while permitting rotation thereof. That is, due to provision of annular clearance "t" power outer roller 92' is permitted to make rotation and shifting relative to shaft 94' by a degree corresponding to the clearance "t".

That is, in the power roller supporting structure of the sixth embodiment 100F, due to the relative rotation and relative shifting of power outer roller 92', a so-called "auto-centering" of the outer roller 92' is established, and thus, respective annular guide grooves 91a and 92a of power inner and outer rollers 91 and 92' can precisely hold ball bearing 93 and thus elongate the life of ball bearing 93.

Figure 9:
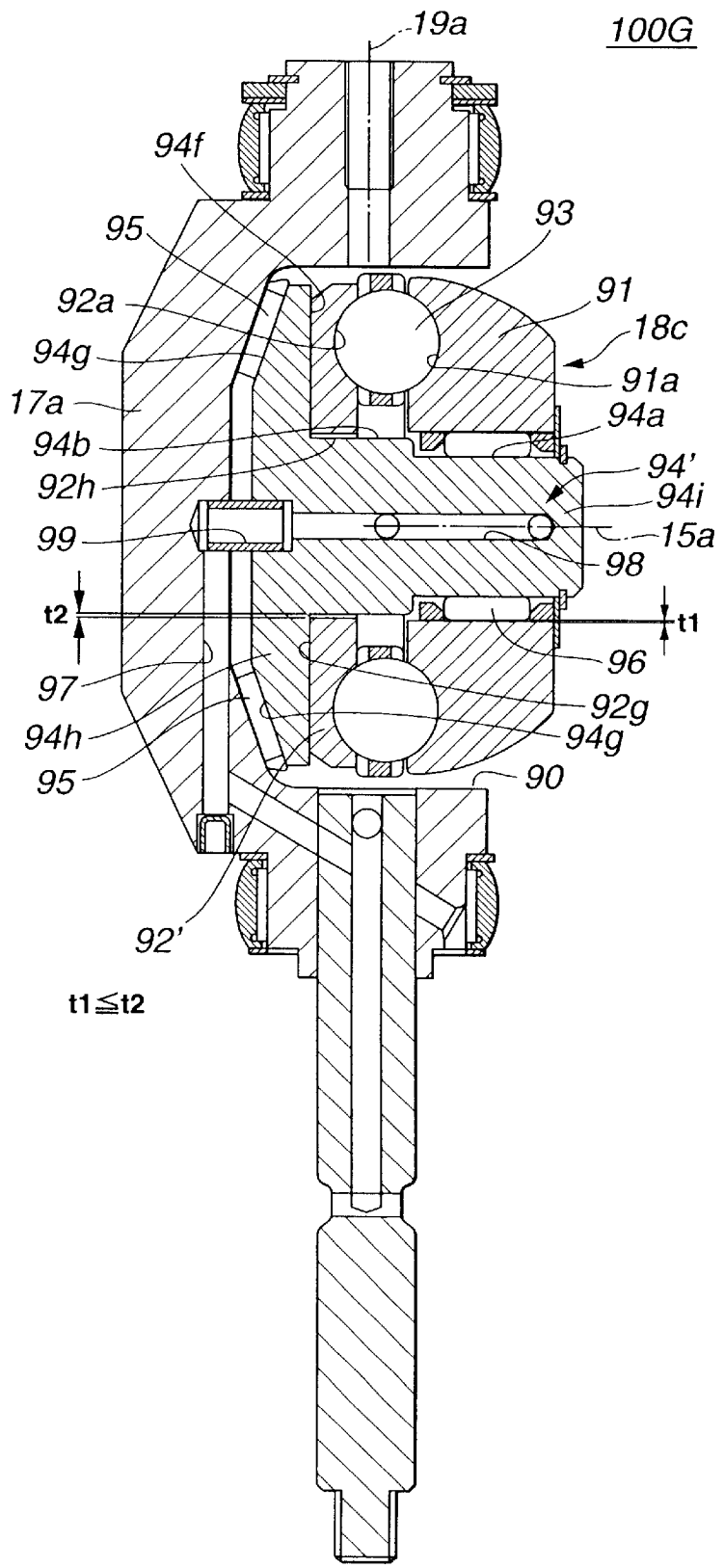

Referring to FIG. 9, there is shown a power roller supporting structure employed in a seventh embodiment 100G of the present invention.

As shown, the power roller supporting structure of this embodiment 100G is similar to that of the above-mentioned sixth embodiment 100F. However, in the device of this embodiment 100G, the distance "t2" between larger diameter shaft portion 94b of shaft 94' and inner surface of circular opening 92h of power outer roller 92' is greater than that "t1" between an outer periphery of roller bearing 96 and an inner surface of circular opening 91b of power inner roller 91.

In this embodiment 100G, relative movement of power inner roller 91 is controlled smaller than that of power outer roller 92'. Of course, the advantages of the sixth embodiment 100F are given to the seventh embodiment 100G. More specifically, in the seventh embodiment 100G, the auto-centering function is applied to power inner roller 91 as well as power outer roller 92'.

In the sixth and seventh embodiments 100F and 100G, it is particularly necessary to finely machine both the flat surface 92g of power outer roller 92' and the flat front (or right) surface 94f of power roller holding portion 94h. With this fine machining, movement of power outer roller 92' in response to that of power inner roller 91 is smoothly carried out, and thus, auto-centering is smoothly and assuredly achieved by both rollers 92' and 91.

Figure 10:
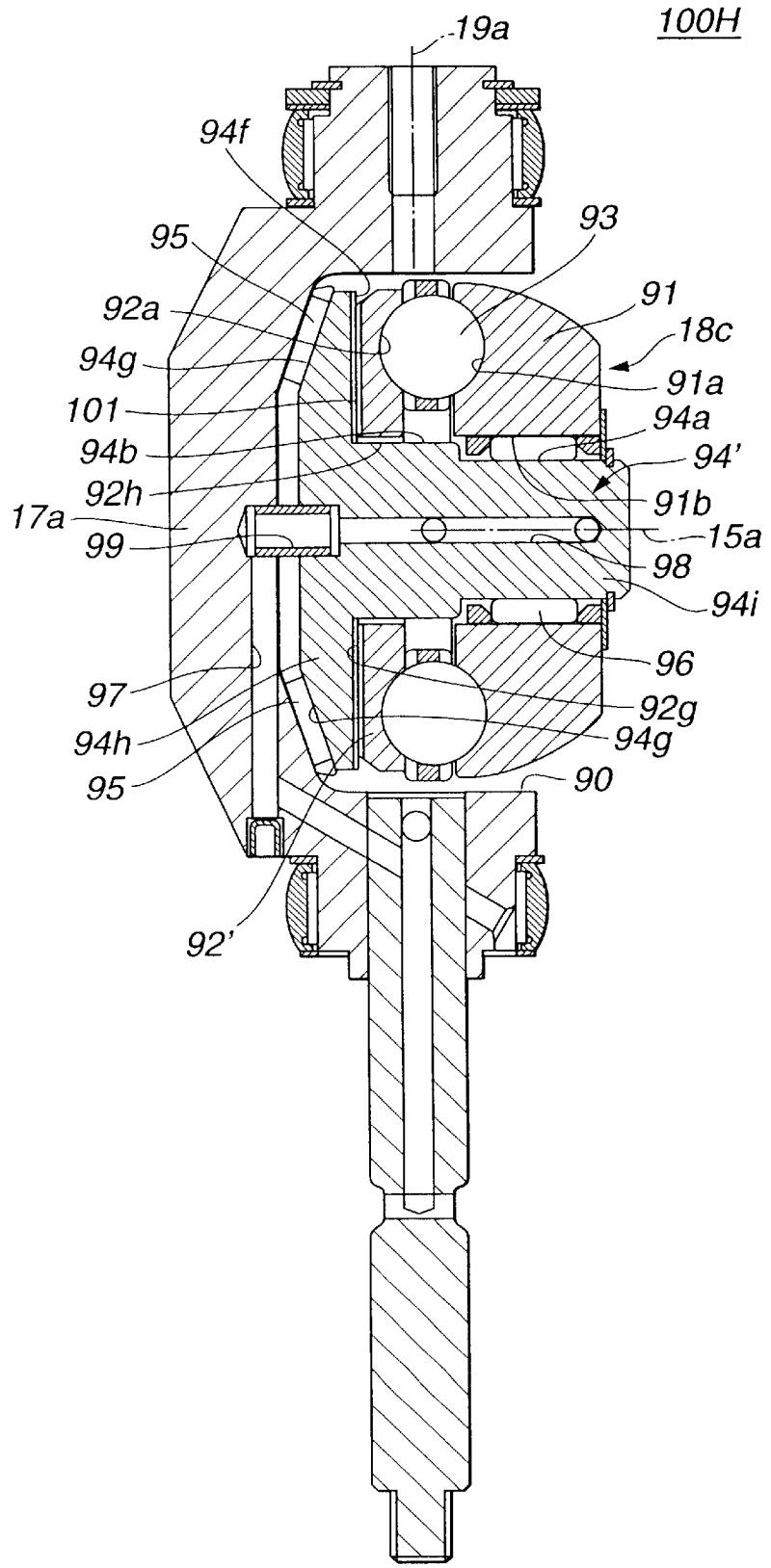

Referring to FIG. 10, there is shown a power roller supporting structure employed in an eighth embodiment 100H of the present invention.

As shown, the power roller supporting structure of this embodiment 100H is similar to that of the above-mentioned seventh embodiment 100G. However, in the device of this eighth embodiment 100H, there is defined a lubricant oil groove 101 between the flat surface 92g of power outer roller 92' and the flat front surface 94f of power roller holding portion 94h.

In this embodiment 100H, the relative rotation and shifting of power outer roller 92' is much smoothly carried out due to provision of lubricant oil groove 101.

Figure 11:
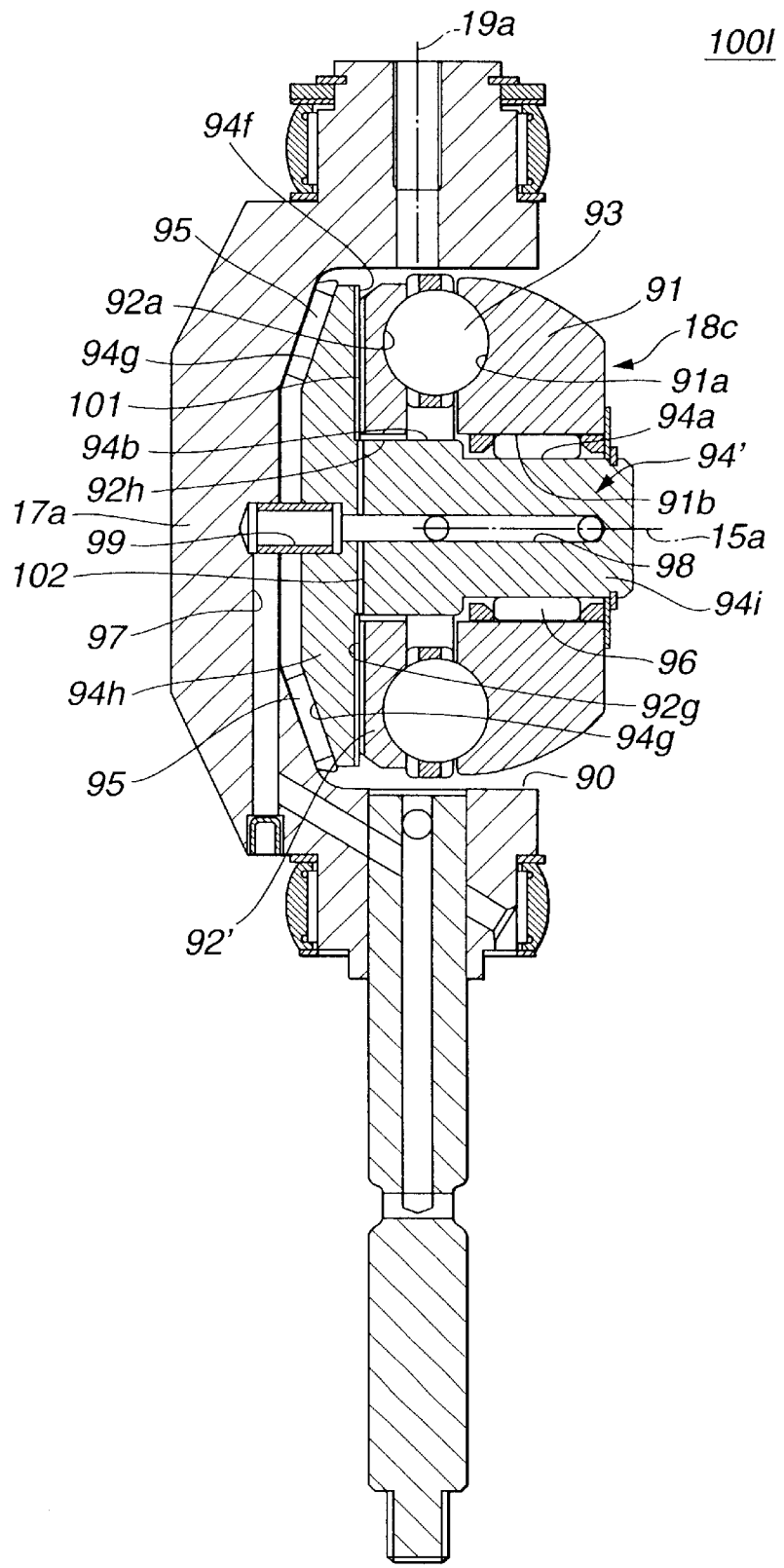

Referring to FIG. 11, there is shown a power roller supporting structure employed in a ninth embodiment 100I of the present invention.

As shown, the power roller supporting structure of this embodiment 100I is similar to that of the above-mentioned eighth embodiment 100H. However, in the device of this ninth embodiment 100I, there is further provided a lubricant oil flow passage 102 which extends diametrically across larger diameter shaft portion 94b of shaft 94' to feed lubricant oil groove 101 with a lubricant oil that is led into an axially extending lubricant oil passage 98 formed in shaft 94'.

In this embodiment 100I, due to provision of oil flow passage 102, feeding of lubricant oil to oil groove 101 is effectively made and thus the relative rotation and shifting of power outer roller 92' is much more effectively carried out than in the above-mentioned eighth embodiment 100H.

In addition to the power roller supporting structures of first to ninth embodiments 100A to 100I, the following modifications are also possible in the present invention.

That is, in the above-mentioned first to fourth embodiments 100A to 100D, the power roller supporting structure is of a so-called slide type. However, if desired, a swing type employed in conventional toroidal type continuously variable transmissions may be used for such supporting structure.

In the first to ninth embodiments, a ball bearing 93 is used as the power roller bearing. However, if desired, a taper roller bearing may be used as the power roller bearing.

The entire contents of Japanese Patent Application 2001-087284 filed Mar. 26, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A toroidal type continuously variable transmission comprising:

input and output discs coaxially arranged;

a pair of power rollers, each being operatively disposed between said input and output discs and including a power inner roller which is frictionally engaged with said input and output discs, a power outer roller which receives an axial load applied to said power inner roller from said input and output discs, a ball bearing which is operatively interposed between said power inner and outer rollers and a shaft which receives a radial load applied to said power inner roller from said input and output discs, a pair of trunnions rotatably supporting said power rollers respectively, each trunnion being connected to a transmission case in a manner to pivot about its pivot axis and having a power roller receiving recess for receiving therein corresponding one of said power rollers; and first roller bearings, each being operatively interposed between an inner wall of said power roller receiving recess of said trunnion and a back side of said power roller, so that the power roller is movable relative to said trunnion in a direction perpendicular to both a pivot axis of the trunnion and a rotation axis of the power roller, wherein said shaft is a one-body member comprises a first shaft portion on which said power outer roller is coaxially and tightly disposed and a second shaft portion on which said power inner roller is coaxially and rotatably disposed.

2. A toroidal type continuously variable transmission as claimed in claim 1, in which an inner wall of said power roller receiving recess is formed with inclined flat portions against which said first roller bearings abut.

3. A toroidal type continuously variable transmission as claimed in claim 2, in which said power outer roller comprises:

a first surface formed with an annular guide groove which operatively receives said ball bearing; and a second surface formed with inclined flat portions which abut against said first roller bearings respectively.

4. A toroidal type continuously variable transmission as claimed in claim 3, in which said first shaft portion of said shaft is formed with an annular flange portion which is intimately received in an annular groove formed in said power outer roller.

5. A toroidal type continuously variable transmission as claimed in claim 3, in which said power outer roller is secured to said first shaft portion by means of a threaded structure.

6. A toroidal type continuously variable transmission as claimed in claim 5, in which said threaded structure comprises:

an externally threaded smaller diameter portion of said first shaft portion;

an annular flange defined by said power outer roller, said annular flange surrounding said externally threaded smaller diameter portion; and a nut engaged with the external thread of said smaller diameter portion to tightly press said annular flange against a raised portion of said first shaft portion.

7. A toroidal type continuously variable transmission as claimed in claim 5, in which said threaded structure comprises:

an external thread formed on said first shaft portion of said shaft; and an internal thread formed on said power outer roller and meshed with said external thread.

8. A toroidal type continuously variable transmission as claimed in claim 2, in which said first shaft portion of said shaft comprises:

a flange portion integral with a major portion of said first shaft portion and having a front flat surface which abuts against a rear flat surface of said power outer roller and a rear surface which is formed with inclined flat portions which abut against said first roller bearings respectively.

9. A toroidal type continuously variable transmission as claimed in claim 8, in which a first annular clearance is defined between the major portion of said first shaft portion and an inner surface of a circular bore of said power outer roller through which said major portion passes.

10. A toroidal type continuously variable transmission as claimed in claim 9, further comprising a second roller bearing which is operatively disposed between said second shaft portion of said shaft and said power outer roller, and in which a second annular clearance is defined between an outer periphery of said second roller bearing an inner surface of a circular bore of said power inner roller through which said second shaft portion of the shaft passes, said second annular clearance being smaller than said first annular clearance in thickness.

11. A toroidal type continuously variable transmission as claimed in claim 9, in which a lubricant oil groove is defined between the flat front surface of said flange portion and the flat rear surface of said power outer roller.

12. A toroidal type continuously variable transmission as claimed in claim 11, in which a lubricant oil flow passage is further provided, which extends diametrically across said first shaft portion to feed said lubricant oil groove with a lubricant oil, said lubricant oil flow passage being connected with an axially extending lubricant oil passage formed in said shaft.

13. A toroidal type continuously variable transmission comprising:

input and output discs coaxially arranged;

a pair of power rollers, each being operatively disposed between said input and output discs and including a power inner roller which is frictionally engaged with said input and output discs, a power outer roller which receives an axial load applied to said power inner roller from said input and output discs, a ball bearing which is operatively interposed between said power inner and outer rollers and a shaft which receives a radial load applied to said power inner roller from said input and output discs, a pair of trunnions rotatably supporting said power rollers respectively, each trunnion being connected to a transmission case in a manner to pivot about its pivot axis and having a power roller receiving recess for receiving therein corresponding one of said power rollers; and first roller bearings, each being operatively interposed between an inner wall of said power roller receiving recess of said trunnion and a back side of said power roller, so that the power roller is movable relative to said trunnion in a direction perpendicular to both a pivot axis of the trunnion and a rotation axis of the power roller, wherein said shaft is a one-body member comprises a first shaft portion on which said power outer roller is coaxially and tightly disposed and a second shaft portion on which said power inner roller is coaxially and rotatably disposed, and wherein said first shaft portion is integrally formed with a flange portion which has a front flat surface which abuts against a rear flat surface of said power outer roller and a rear surface which is formed with inclined flat portions which abut against said first roller bearings respectively.

14. A toroidal type continuously variable transmission as claimed in claim 1, wherein the shaft is separate from the power outer roller.

15. A toroidal type continuously variable transmission as claimed in claim 13, wherein the shaft is separate from the power outer roller.

* * * * *